United States Patent
Wang et al.

(10) Patent No.: US 12,497,667 B2
(45) Date of Patent: Dec. 16, 2025

(54) QUANTITATIVE DETECTION METHOD FOR SIX ANTIBIOTIC DRUG RESISTANT GENES IN AQUATIC PRODUCT

(71) Applicant: ZHOUSHAN INSTITUTE FOR FOOD AND DRUG CONTROL, Zhoushan (CN)

(72) Inventors: Pingya Wang, Zhoushan (CN); Qiaoling Zhao, Zhoushan (CN); Jiajia Wu, Zhoushan (CN); Zhuliang Huang, Zhoushan (CN); Haifeng Tang, Zhoushan (CN); Zhiyuan Dai, Zhoushan (CN)

(73) Assignee: ZHOUSHAN INSTITUTE FOR FOOD AND DRUG CONTROL, Zhoushan (CN)

( * ) Notice: Subject to any disclaimer, the term of this patent is extended or adjusted under 35 U.S.C. 154(b) by 675 days.

(21) Appl. No.: 17/904,202

(22) PCT Filed: Jun. 16, 2020

(86) PCT No.: PCT/CN2020/096358
§ 371 (c)(1),
(2) Date: Aug. 12, 2022

(87) PCT Pub. No.: WO2021/253228
PCT Pub. Date: Dec. 23, 2021

(65) Prior Publication Data
US 2023/0242999 A1     Aug. 3, 2023

(51) Int. Cl.
*C12Q 1/68*     (2018.01)
*C12Q 1/689*     (2018.01)

(52) U.S. Cl.
CPC .................................. *C12Q 1/689* (2013.01)

(58) Field of Classification Search
None
See application file for complete search history.

(56) References Cited

FOREIGN PATENT DOCUMENTS

| CN | 102363814 A | 2/2012 |
|---|---|---|
| CN | 102534002 A | 7/2012 |

(Continued)

OTHER PUBLICATIONS

Guan et al, Analysis of Bacterial Community Characteristics, Abundance of Antibiotics and Antibiotic Resistance Genes Along a Pollution Gradient of Ba River in Xi'an, China, Front Microbiol. Dec. 21, 2018:9:3191. doi: 10.3389/fmicb.2018.03191. eCollection 2018.*

(Continued)

*Primary Examiner* — Aaron A Priest
(74) *Attorney, Agent, or Firm* — INNOVATION CAPITAL LAW GROUP, LLP; Vic Lin

(57) ABSTRACT

The present invention relates to the technical field of biology, and provides a quantitative detection method for six antibiotic drug resistant genes in an aquatic product. The method comprises: taking the total DNA of bacteria carried by an aquatic product to be tested as a template, respectively using a primer pair I to a primer pair VI to carry out fluorescent quantitative PCR amplification, and quantifying antibiotic drug resistant genes tetA, sul2, cmlA, qnrS, aac (6')-Ib, and blaPSE in said aquatic product according to the Ct value.

3 Claims, 3 Drawing Sheets
Specification includes a Sequence Listing.

(56) References Cited

FOREIGN PATENT DOCUMENTS

| CN | 105420383 A |   | 3/2016  |            |
|----|-------------|---|---------|------------|
| CN | 105950732 A | * | 9/2016  | C12Q 1/6837 |
| CN | 110512009 A |   | 11/2019 |            |
| CN | 111471779 A |   | 7/2020  |            |

OTHER PUBLICATIONS

Moland et al, Prevalence of Newer β-Lactamases in Gram-Negative Clinical Isolates Collected in the United States from 2001 to 2002, J Clin Microbiol. Sep. 2006;44(9):3318-3324. doi: 10.1128/JCM.00756-06.*

Salah et al, Distribution of quinolone resistance gene (qnr) in ESBL—producing *Escherichia coli* and *klebsiella* spp. in Lomé, Togo, Antimicrob Resist Infect Control. Jun. 18, 2019:8:104. doi: 10.1186/s13756-019-0552-0.*

Piedra-Carrasco et al, Carbapenemase-producing enterobacteriaceae recovered from a Spanish river ecosystem, PLoS One. Apr. 5, 2017;12(4):e0175246. doi: 10.1371/journal.pone.0175246. eCollection 2017.*

Wang et al, Influence of Soil Characteristics and Proximity to Antarctic Research Stations on Abundance of Antibiotic Resistance Genes in Soils, Environ Sci Technol. Dec. 6, 2016;50(23):12621-12629. doi: 10.1021/acs.est.6b02863. Epub Nov. 18, 2016.*

Muurinen et al, Influence of Manure Application on the Environmental Resistome under Finnish Agricultural Practice with Restricted Antibiotic Use, Environ Sci Technol. Jun. 6, 2017;51(11):5989-5999. doi: 10.1021/acs.est.7b00551. Epub May 11, 2017.*

Molist, Microbial communities driving emerging contaminant removal. Impact of treated wastewater on the ecosystem, doctoral thesis, Jun. 8, 2018.*

Chuah, Lo., et al. "Genetic relatedness, antimicrobial resistance and biofilm formation of *Salmonella* isolated from naturally contaminated poultry and their processing environment in northern Malaysia", Food Research International, Mar. 31, 2018, pp. 743-751, 105.

Gay, K., et al. "Plasmid-mediated quinolone resistance in non-Typhi serotypes of *Salmonella enteric*", Clinical Infectious Diseases, Aug. 1, 2006, p. 297-304,43-3.

Han, Y., et al. "The impact and mechanism of quaternary ammonium compounds on the transmission of antibiotic resistance genes.", Environmental Science and Pollution Research , Aug. 1, 2019, pp. 28352-28360, 26.

International Search Report dated Nov. 25, 2020 from PCT Application No. PCT/CN2020/096358.

Moland, Es. , et al. "Prevalence of newer beta-lactamases in gram-negative clinical isolates collected in the United States from 2001 to 2002", Journal of Clinical Microbiology, Sep. 30, 2006, pp. 3319-3324, 44-9.

Qiao, Y. "Study on the major pathogenic bacteria resistance of aquaculture in the coastal regions of Jiangsu province", Full-Text Database of China Excellent Master's Thesis Agricultural Science and Technology Series)Feb. 15, 2016, pp. D052-193, CN.

Wang, H. , et al. "Quantitative Detection of Six Classes of Antibiotic Resistance and Class I Integron Genes in Aquatic Products", Modern Food Technology) Feb. 23, 2017, pp. 270-273, 33-5, CN.

Ye, F., "A study of contamination and detection methods of antibiotic resistance genes from aquatic products", Full-Text Database of China Excellent Master's Thesis), May 15, 2020, p. B014-504, CN.

Zhao, Q. , et al. "A study of plasmid-mediated aac( 6")-lb gene determination and quinolone resistance", Laboratory Medicine ), Mar. 14, 2013, p. 201, 28-3, CN.

* cited by examiner

```
                         SEQUENCE LISTING

<160> NUMBER OF SEQ ID NOS: 12

<210> SEQ ID NO 1
<211> LENGTH: 20
<212> TYPE: DNA
<213> ORGANISM: Artificial Sequence
<220> FEATURE:
<222> LOCATION: (1)..(20)
<223> OTHER INFORMATION: primer tetA-F

<400> SEQUENCE: 1
gctacatcct gcttgccttc                                                 20

<210> SEQ ID NO 2
<211> LENGTH: 20
<212> TYPE: DNA
<213> ORGANISM: Artificial Sequence
<220> FEATURE:
<222> LOCATION: (1)..(20)
<223> OTHER INFORMATION: primer tetA-R

<400> SEQUENCE: 2
catagatcgc cgtgaagagg                                                 20

<210> SEQ ID NO 3
<211> LENGTH: 22
<212> TYPE: DNA
<213> ORGANISM: Artificial Sequence
<220> FEATURE:
<222> LOCATION: (1)..(22)
<223> OTHER INFORMATION: primer sul2-F

<400> SEQUENCE: 3
tccgatggag gccggtatct gg                                              22

<210> SEQ ID NO 4
<211> LENGTH: 22
<212> TYPE: DNA
<213> ORGANISM: Artificial Sequence
<220> FEATURE:
<222> LOCATION: (1)..(22)
<223> OTHER INFORMATION: primer sul2-R
```

```
<400> SEQUENCE: 4
cgggaatgcc atctgccttg ag                                               22

<210> SEQ ID NO 5
<211> LENGTH: 20
<212> TYPE: DNA
<213> ORGANISM: Artificial Sequence
<220> FEATURE:
<222> LOCATION: (1)..(20)
<223> OTHER INFORMATION: primer cmlA-F

<400> SEQUENCE: 5
ttggtacgac agcgagcaca                                                  20

<210> SEQ ID NO 6
<211> LENGTH: 18
<212> TYPE: DNA
<213> ORGANISM: Artificial Sequence
<220> FEATURE:
<222> LOCATION: (1)..(18)
<223> OTHER INFORMATION: primer cmlA-R

<400> SEQUENCE: 6
aaacaaggca cgccgagg                                                    18

<210> SEQ ID NO 7
<211> LENGTH: 20
<212> TYPE: DNA
<213> ORGANISM: Artificial Sequence
<220> FEATURE:
<222> LOCATION: (1)..(20)
<223> OTHER INFORMATION: primer qnrS-F

<400> SEQUENCE: 7
acgacattcg tcaactgcaa                                                  20

<210> SEQ ID NO 8
<211> LENGTH: 20
<212> TYPE: DNA
<213> ORGANISM: Artificial Sequence
<220> FEATURE:
<222> LOCATION: (1)..(20)
<223> OTHER INFORMATION: primer qnrS-R

<400> SEQUENCE: 8
taaattggca ccctgtaggc                                                  20

<210> SEQ ID NO 9
<211> LENGTH: 22
<212> TYPE: DNA
<213> ORGANISM: Artificial Sequence
<220> FEATURE:
<222> LOCATION: (1)..(22)
<223> OTHER INFORMATION: primer aac(6')-Ib-F

<400> SEQUENCE: 9
tgcgatgctc tatgagtggc ta                                               22

<210> SEQ ID NO 10
<211> LENGTH: 20
<212> TYPE: DNA
<213> ORGANISM: Artificial Sequence
<220> FEATURE:
<222> LOCATION: (1)..(20)
<223> OTHER INFORMATION: primer aac(6')-Ib-R
```

```
<400> SEQUENCE: 10
ctcgaatgcc tggcgtgttt                                              20

<210> SEQ ID NO 11
<211> LENGTH: 20
<212> TYPE: DNA
<213> ORGANISM: Artificial Sequence
<220> FEATURE:
<222> LOCATION: (1)..(20)
<223> OTHER INFORMATION: primer blaPSE-F

<400> SEQUENCE: 11
ctcgatgatg cgtgcttcgc                                              20

<210> SEQ ID NO 12
<211> LENGTH: 20
<212> TYPE: DNA
<213> ORGANISM: Artificial Sequence
<220> FEATURE:
<222> LOCATION: (1)..(20)
<223> OTHER INFORMATION: primer blaPSE-R

<400> SEQUENCE: 12
gcgactgtga tgtataaacg                                              20
```

QUANTITATIVE DETECTION METHOD FOR SIX ANTIBIOTIC DRUG RESISTANT GENES IN AQUATIC PRODUCT

REFERENCE TO SEQUENCE LISTING

The official copy of the sequence listing is submitted electronically via EFS-Web as an ASCII formatted sequence listing with a file named "NIN1-PAU38-sequencelisting-updated", created on Sep. 15, 2022, and having a size of 2,603 bytes and is filed on Dec. 16, 2022. The sequence listing contained in this ASCII formatted document is part of the specification and is herein incorporated by reference in its entirety.

TECHNICAL FIELD

The invention belongs to the technical field of biology, and particularly relates to a quantitative detection method for six antibiotic drug resistant genes in an aquatic product.

DESCRIPTION OF RELATED ART

China is a major producer and exporter of aquatic products; and a lot of antibiotics are usually used in aquaculture to treat diseases and promote growth. With the abuse of antibiotics, antibiotic resistance of bacteria becomes increasingly serious, antibiotic drug resistant genes (ARGs) are intrinsic reasons of development of antibiotic resistance, can be horizontally transferred between bacteria, and may be transmitted into pathogenic bacteria in human body, thereby posing potential threats to human health and ecological safety. At present, researches on ARGs in aquatic products is mostly based on a traditional isolation and culture method, but more than 95% of uncultured bacteria in nature cannot be isolated by this method. Therefore, when this method is individually used to research ARGs in the aquatic products, information that a small number of culturable microorganisms carry ARGs can only be revealed, while pollution status of ARGs in the aquatic products cannot be objectively reflected and overall evaluated. When a molecular biotechnology is used to analyze total DNA of bacteria in aquatic products, content and distribution of ARGs in the aquatic products can be revealed more objectively. Existing reports clearly show that the types and quantities of ARGs carried in aquatic products in China are quite complicated, so a quantitative detection method for multiple ARGs is urgent to be established to more effectively realize detection and analysis of ARGs in the aquatic products. Compared with conventional PCR, real-time fluorescent quantitative PCR (qPCR) has many advantages, for example, simultaneous PCR amplification and detection may be realized to significantly shorten the operating time; and in addition, the qPCR method can synchronously detect changes of fluorescence intensity during PCR reaction without opening reaction tubes, thereby realizing the quantitative detection of target genes and avoiding product pollution.

In the prior art, Chinese Patent Publication No. CN 102363814 B discloses an absolute fluorescent quantitative PCR detection method, comprising the following steps: making double-stranded linear plasmids be diluted into different concentrations and serve as standards, amplifying a single-stranded cDNA sample to be tested once to obtain a double-stranded cDNA sample to be tested, performing fluorescent quantitative PCR reaction on the double-stranded cDNA sample to be tested and the double-stranded linear plasmid standards to obtain a Ct value corresponding to each copy number, taking a logarithmic value of the copy number of standards as the abscissa and the Ct value corresponding to each obtained copy number as the ordinate to obtain a standard curve, substituting the Ct value of a sample to be tested into the standard curve to obtain an initial copy number of the sample to be tested. The absolute fluorescent quantitative PCR detection method provided by the invention can more truly measure an absolute copy number of a target segment, so that the measured result is more accurate.

BRIEF SUMMARY OF THE INVENTION

A purpose of the invention is to provide a quantitative detection method for six antibiotic drug resistant genes in an aquatic product; primers used in the method are well designed; and the obtained standard curves of six antibiotic drug resistant genes have excellent linear relationship and better accuracy and repeatability, and may be used to calculate the copy number of each gene in the sample to be tested. 31 is taken as a detection limit of Ct; and an established qPCR method has a minimum detection limit of $6.6 \times 10^4$ copies/μL for blaPSE and a minimum detection limit of 24-202 copies/μL for tetA, sul2, cmlA, qnrS and aac(6')-Ib.

To achieve the above purpose, the following technical solution is adopted by the invention:

a primer combination A is provided, including a primer combination A, which includes a primer pair I, a primer pair II, a primer pair III, a primer pair IV, a primer pair V and a primer pair VI, wherein the primer pair I is composed of a primer tetA-F and a primer tetA-R, a sequence of the primer tetA-F is SEQ ID NO.1, and a sequence of the primer tetA-R is SEQ ID NO.2;

the primer pair II is composed of a primer sul2-F and a primer sul2-R, a sequence of the primer sul2-F is SEQ ID NO.3, and a sequence of the primer sul2-R is SEQ ID NO.4;

the primer pair III is composed of a primer cmlA-F and a primer cmlA-R, a sequence of the primer cmlA-F is SEQ ID NO.5, and a sequence of the primer cmlA-R is SEQ ID NO.6;

the primer pair IV is composed of a primer qnrS-F and a primer qnrS-R, a sequence of the primer qnrS-F is SEQ ID NO.7, and a sequence of the primer qnrS-R is SEQ ID NO.8;

the primer pair V is composed of a primer aac(6')-Ib-F and a primer aac(6')-Ib-R, a sequence of the primer aac(6')-Ib-F is SEQ ID NO.9, and a sequence of the primer aac(6')-Ib-R is SEQ ID NO.10; and the primer pair VI is composed of a primer blaPSE-F and a primer blaPSE-R, a sequence of the primer blaPSE-F is SEQ ID NO.11, and a sequence of the primer blaPSE-R is SEQ ID NO.12.

Use of the primer combination A in detection of six antibiotic drug resistant genes in an aquatic product by a real-time fluorescent quantitative PCR technology is provided, wherein the six antibiotic drug resistant genes are tetA, sul2, cmlA, qnrS, aac(6')-Ib and blaPSE respectively.

A quantitative detection method for six antibiotic drug resistant genes in an aquatic product is provided, wherein the method includes the following steps: taking the total DNA of bacteria carried by an aquatic product to be tested as a template, respectively using a primer pair I to a primer pair VI to carry out fluorescent quantitative PCR amplification, and quantifying antibiotic drug resistant genes tetA, sul2, cmlA, qnrS, aac(6')-Ib, and blaPSE in said aquatic product according to the Ct value.

Preferably, a system for the fluorescent quantitative PCR amplification includes: 10 µL of TB Premix Ex Taq, 0.4 µL of each primer and 2 µL of DNA template, supplemented with ddH$_2$O to 20 µl.

Preferably, reaction conditions of the fluorescent quantitative PCR amplification include: pre-denaturation at 95° C. for 30 s; and denaturation at 95° C. for 5 s, annealing at 60° C. for 30 s and extension at 72° C. for 30 s, for 40 cycles.

Preferably, minimum detection limits of tetA, sul2, cmlA, qnrS and aac(6')-Ib are 24-202 copies/µL; and a minimum detection limit of blaPSE is 6.6×10$^4$ copies/µL.

Preferably, sul2 and blaPSE, blaPSE and aac(6')-Ib, and cmlA and qnrS are subjected to significant positive correlation.

Use of the quantitative detection method for six antibiotic drug resistant genes in an aquatic product in evaluating pollution status of antibiotic drug resistant genes of microbial flora in the aquatic product is provided.

The invention has beneficial effects that:

According to the invention, a primer combination A is provided for real-time fluorescent quantitative PCR detection of six antibiotic drug resistant genes, including tetA, sul2, cmlA, qnrS, aac(6')-Ib and blaPSE; an amplification efficiency E between the Ct value and the copy numbers of each target gene ranges from 90.42% to 106.23%, so the amplification efficiency is within a qPCR efficiency range (90%-110%); a correlation coefficient $R^2$ ranges from 0.9901 to 0.9987; a slope of curves ranges from −3.1811 to −3.5752, which meets requirements (−3.1 to −3.59) of qPCR experiment; relative standard deviation (RSD) are all less than 5.1%; standard curves of the target genes have excellent linear relationship; and all curves have better accuracy and repeatability, and may be used to calculate the copy number of each gene in the sample to be tested. 31 is taken as the detection limit of Ct; and the established qPCR method has a minimum detection limit of 6.6×10$^4$ copies/µL for blaPSE and a minimum detection limit of 24-202 copies/µL for tetA, sul2, cmlA, qnrS and aac(6')-Ib.

DETAILED DESCRIPTION OF THE INVENTION

Figure 1:
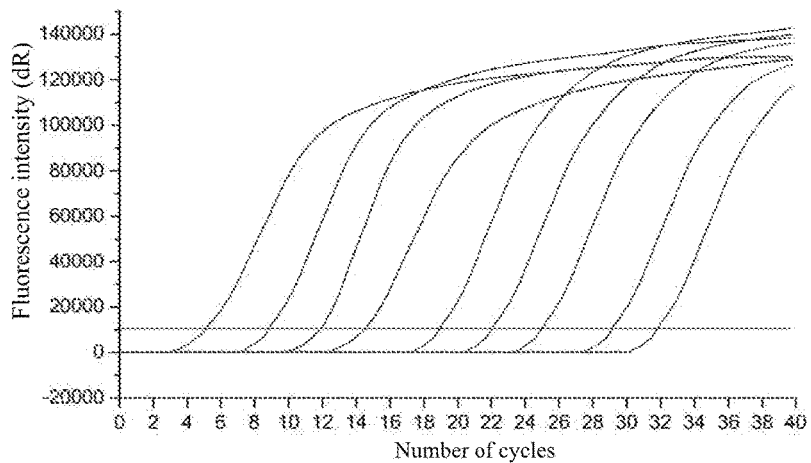
FIG. 1 shows an amplification curve for real-time fluorescent PCR of blaPSE in Embodiment 3 of the invention.

Unless otherwise stated, all publications, patent applications, patents and other references mentioned herein are hereby incorporated by reference in entirety as if the whole text is set forth.

Unless otherwise defined, all technical and scientific terms used herein have the same meanings as those commonly understood by those ordinary skilled in the art to which the invention belongs. In the case of conflict, the definition in the Description shall prevail.

When the quantity, concentration or other values or parameters are given in terms of ranges, preferred ranges or a series of upper preferred values and lower preferred values, it should be understood that all ranges formed by any pair of values from any larger range limit or preferred value and any smaller range limit or preferred value are specifically disclosed, no matter whether the ranges are respectively disclosed or not. For example, when a range of "1 to 5" is described, the described range should be interpreted as including ranges of "1 to 4", "1 to 3", "1 to 2", "1 to 2 and 4 to 5", "1 to 3 and 5", etc. Unless otherwise stated, where numerical ranges are described herein, the ranges are intended to include the end values of the ranges and all integers and fractions within the ranges.

In addition, words "a" and "an" preceding an element or component of the invention are intended to indicate no limitation on the frequency of appearance (i.e., occurrence) of the element or component. Therefore, "a" or "an" should be understood as including one or at least one; and unless the number is expressly singular, the singular element or component also includes plural forms.

Embodiments of the invention, including the embodiments of the invention described in the Summary of Invention and any other embodiments described below, can be randomly combined.

The invention will be described in detail below.

A primer combination A is provided, including a primer combination A, which includes a primer pair I, a primer pair II, a primer pair III, a primer pair IV, a primer pair V and a primer pair VI, wherein the primer pair I is composed of a primer tetA-F and a primer tetA-R, a sequence of the primer tetA-F is SEQ ID NO.1, and a sequence of the primer tetA-R is SEQ ID NO.2;

the primer pair II is composed of a primer sul2-F and a primer sul2-R, a sequence of the primer sul2-F is SEQ ID NO.3, and a sequence of the primer sul2-R is SEQ ID NO.4;

the primer pair III is composed of a primer cmlA-F and a primer cmlA-R, a sequence of the primer cmlA-F is SEQ ID NO.5, and a sequence of the primer cmlA-R is SEQ ID NO.6;

the primer pair IV is composed of a primer qnrS-F and a primer qnrS-R, a sequence of the primer qnrS-F is SEQ ID NO.7, and a sequence of the primer qnrS-R is SEQ ID NO.8;

the primer pair V is composed of a primer aac(6')-Ib-F and a primer aac(6')-Ib-R, a sequence of the primer aac(6')-Ib-F is SEQ ID NO.9, and a sequence of the primer aac(6')-Ib-R is SEQ ID NO.10; and the primer pair VI is composed of a primer blaPSE-F and a primer blaPSE-R, a sequence of the primer blaPSE-F is SEQ ID NO.11, and a sequence of the primer blaPSE-R is SEQ ID NO.12.

Use of the primer combination A in detection of six antibiotic drug resistant genes in an aquatic product by a real-time fluorescent quantitative PCR technology is provided, wherein the six antibiotic drug resistant genes are tetA, sul2, cmlA, qnrS, aac(6')-Ib and blaPSE respectively. Preferably, the aquatic product includes shrimps and fishes. More preferably, a method for extracting total DNA of bacteria carried by the aquatic product includes the following steps: gills, intestines and epidermal mucus of fishes, and sand veins and shrimp heads of shrimps were respectively collected under sterile conditions, and were cut into pieces;

then 8-12 g of sample was taken and added into a conical flask containing 88-92 mL of sterile saline solution, and was fully shaken and uniformly mixed to prepare a sample suspension. The suspension was dipped with an inoculating loop and placed in a test tube containing nutrient broth, and then was cultured at 28-32° C. for 10-14 h. 0.8-1.2 mL of culture was taken and subjected to boiling water bath for 4-6 min, then was immediately put on ice to be cooled for 2-3 min, and was centrifuged at 4500-5500 r/min for 45-70 s; and supernatant was taken as a DNA template.

Preferably, 31 is taken as a detection limit of the Ct value, i.e., when the Ct value is greater than 30, a negative result is judged.

Preferably, a system for fluorescent quantitative PCR amplification includes: 10 μL of TB Premix Ex Taq, 0.4 μL of each primer and 2 μL of DNA template, supplemented with ddH$_2$O to 20 μl.

Preferably, reaction conditions of the fluorescent quantitative PCR amplification include: pre-denaturation at 95° C. for 30 s; and denaturation at 95° C. for 5 s, annealing at 60° C. for 30 s and extension at 72° C. for 30 s, for 40 cycles.

Preferably, minimum detection limits of tetA, sul2, cmlA, qnrS and aac(6')-Ib are 24-202 copies/μL; and a minimum detection limit of blaPSE is $6.6 \times 10^4$ copies/μL.

Preferably, sul2 and blaPSE, blaPSE and aac(6')-Ib, and cmlA and qnrS are subjected to significant positive correlation.

Preferably, the system for the fluorescent quantitative PCR amplification further includes 1 μL of 5.2-10.7 mmol/L agmatine sulfate. Real-time fluorescent PCR amplification efficiencies of tetA and sul2 are higher than 1. A main reason is analyzed as follows: due to existence of nonspecific amplification products, agmatine sulfate can be added to promote close cooperation between primers and templates, inhibit the occurrence of nonspecific reactions during real-time fluorescent PCR of tetA and sul2, and prevent nonspecific amplification from interfering with quantitative detection, so that amplification efficiencies of tetA and sul2 are closer to 1, and an established real-time quantitative PCR detection method has better accuracy and repeatability for detection of genes tetA and sul2.

Preferably, the system for the fluorescent quantitative PCR amplification further includes 2 μL of 2.2-3.6 mol/L 3,5-dihydroxy-3-methylpentanoic acid. Primers of blaPSE have relatively long target sequences; and 3,5-dihydroxy-3-methylpentanoic acid can be added to benefit improvement of extension efficiency of Taq enzyme during real-time fluorescent PCR amplification, promote the real-time fluorescent PCR amplification and improve amplification efficiency, so that the amplification efficiency of blaPSE is closer to 1, a minimum detection limit of blaPSE is reduced, and the established real-time fluorescent quantitative PCR detection method has better sensitivity, accuracy and repeatability for detection of ARG blaPSE.

Use of agmatine sulfate in improvement of sensitivity of real-time fluorescent quantitative PCR to detect antibiotic drug resistant genes is provided.

Use of the quantitative detection method for six antibiotic drug resistant genes in an aquatic product in evaluating pollution status of antibiotic drug resistant genes of microbial flora in the aquatic product is provided.

The invention will be further described in detail in combination with embodiments below.

Embodiment 1

A quantitative detection method for six antibiotic drug resistant genes in an aquatic product includes:

Positive strains: verified positive control strains carrying genes tetA, sul2, blaPSE, cmlA, qnrS, aac(6')-Ib, intI1 and 16S rDNA respectively.

Main reagents: LA Taq DNA polymerase, 100 bp DNA Ladder, *E. coli* DH5α competent cells, TB Green Premix Ex Taq and pTG19-T Vector, all purchased from Dalian Takara Biotechnology Co., Ltd.; Safe Green nucleic acid dye (Monad Biotech Co., Ltd.); and UNIQ-10 column agarose gel DNA recovery kit and plasmid extraction mini kit, purchased from Sango Biotech (Shanghai) Co., Ltd.

Instruments and equipment: gel electrophoresis instrument, T100 PCR instrument, Mini Opticon Monitor 3 real-time fluorescent quantitative PCR instrument (Bio-Rad Laboratories, Inc., USA); BSA124S-CW electronic balance (Sartorius Scientific Instruments (Beijing) Co., Ltd.); Fresco 21 high-speed refrigerated centrifuge and Evolution 60s ultraviolet-visible spectrophotometer (Thermo Fisher Scientific, Inc., USA); LRH-150-S constant temperature and humidity incubator (Shanghai Huyueming Science Instrument Co., Ltd.); and MLS-3781L-PC autoclave sterilizer (Panasonic Corporation).

Construction of Plasmid Standards:

Acquisition of target gene segments: bacteria were lysed by a boiling method; a single colony was selected and added into an Eppendorf tube filled with 50 μL of sterile water; the bacteria were resuspended, boiled at 100° C. for 5 min, then immediately transferred to an ice bath for 2 min, and centrifuged at 5000 r/min for 1 min; supernatant was taken as a DNA template; the extracted bacterial DNA was taken as a template, and a 25 μL reaction system was adopted to perform PCR amplification, wherein the reaction system includes 1.5 μL of 10×LA buffer (Mg$^{2+}$ plus), 2 μL of dNTP Mix (2.5 mmol/L), 1 μL of upstream primer, 1 μL of downstream primer, 0.1 μL of LA Taq (5 U/μL), 2 μL of DNA template and 17.4 μL of ddH$_2$O. Primer sequences of antibiotic drug resistant genes tetA, sul2, blaPSE, cmlA, qnrS and aac(6')-Ib, intI1 integron and reference gene 16S rDNA are shown in Table 1. Reaction conditions include: pre-denaturation at 94° C. for 5 min; denaturation at 94° C. for 60 s, annealing at 60° C. for 60 s, extension at 72° C. for 60 s, for 34 cycles; and extension at 72° C. for 10 min. DNA was recovered according to instruction of a UNIQ-10 column micro agarose gel DNA recovery kit.

TABLE 1

Amplification Primers of Target Genes

| Target gene | Primer sequence (5'-3') | Amplification length (bp) |
|---|---|---|
| tetA | F GCTACATCCTGCTTGCCTTC<br>R CATAGATCGCCGTGAAGAGG | 210 |
| sul2 | F TCCGATGGAGGCCGGTATCTGG<br>R CGGGAATGCCATCTGCCTTGAG | 191 |
| blaPSE | F CTCGATGATGCGTGCTTCGC<br>R GCGACTGTGATGTATAAACG | 523 |
| cm/A | F TTGGTACGACAGCGAGCACA<br>R AAACAAGGCACGCCGAGG | 234 |
| qnrS | F ACGACATTCGTCAACTGCAA<br>R TAAATTGGCACCCTGTAGGC | 417 |

TABLE 1-continued

Amplification Primers of Target Genes

| Target gene | Primer sequence (5'-3') | Amplification length (bp) |
|---|---|---|
| aac(6')-Ib | F TGCGATGCTCTATGAGTGGCTA<br>R CTCGAATGCCTGGCGTGTTT | 482 |
| int I 1 | F CTCGATGATGCGTGCTTCGC<br>R GCGACTGTGATGTATAAACG | 146 |
| 16S rDNA | F CGGTGAATACGTTCYCGG<br>R GGWTACCTTGTTACGACTT | 142 |

Construction of plasmids: pTG19-T Vector was used as a vector, with a length of 2880 bp. Overnight ligation was performed at 4° C. A ligation system included: 1 µL of pTG19-T Vector (50 ng/µL), 1 µL of DNA template, 5 µL of Solution I and 5 µL of ddH$_2$O. 10 µL of ligation product of each gene was added into 50 µL of E. coli DH5a competent cells, and then subjected to ice bath for 30 min. A centrifuge tube was placed in a water bath at 42° C. for 90 s, and then was rapidly put into ice to be cooled for 3 min. 700 µL of sterile 2×YT liquid medium was added into the centrifuge tube, uniformly mixed, and then placed on a shaker at 37° C. and 150 r/min for shake cultivation for 3 min to revive the bacteria. 100 µL of bacteria solution was added to a surface of 2×YT solid medium containing 100 µg/mL of ampicillin (Amp); and the bacteria solution was uniformly coated with a sterile coating bar. A plate was inverted; and the bacteria solution was cultured at 37° C. for 12-16 h. A single colony on the plate was randomly selected and added into 2 mL of 2×YT liquid medium containing 100 µg/mL of Amp, and cultured at 37° C. for 12-16 h. A cultured bacteria solution was taken as a template, and vector universal primers M13F-47 and M13R-48 were taken to perform PCR reaction, thereby screening out positive clones. 2 mL of fresh bacteria solution was taken to perform plasmid extraction according to the instruction of the plasmid extraction mini kit.

Reaction conditions of qPCR: a qPCR reaction system (20 µL) included 10 µL of TB Premix Ex Taq, 0.4 µL of each primer, 2 µL of DNA template and 7.2 µL of ddH$_2$O. The reaction conditions included: pre-denaturation at 95° C. for 30 s; and denaturation at 95° C. for 5 s, annealing at 60° C. for 30 s, and extension at 72° C. for 30 s, for 40 cycles. Three replicates were set for each sample. 31 was taken as a detection limit of Ct, i.e., when a Ct value was greater than 30, a negative result was judged. A ratio of absolute copy number of an ARG to absolute copy number of a reference gene 16S rDNA was calculated to obtain a relative abundance of the gene, which can be used to compare relative contents of the antibiotic drug resistant genes in the sample to be tested.

Embodiment 2

A qPCR reaction system (20 µL) included 10 µL of TB Premix Ex Taq, 0.4 µL of each primer, 2 µL of DNA template, 1 µL of 8.4 mmol/L agmatine sulfate and 6.2 µL of ddH$_2$O. The rest were completely the same as those of Embodiment 1.

Embodiment 3

A qPCR reaction system (20 µL) included 10 µL of TB Premix Ex Taq, 0.4 µL of each primer, 2 µL of DNA template, 1 µL of 8.4 mmol/L agmatine sulfate, 2 µL of 2.6 mol/L 3,5-dihydroxy-3-methylpentanoic acid and 4.2 µL of ddH$_2$O. The rest were completely the same as those of Embodiment 1. A real-time fluorescent PCR amplification curve of blaPSE is shown in FIG. 1. FIG. 1 shows that the amplification curve of blaPSE has a good S-shape and good specificity, and a slope of the amplification curve at an exponential growth stage is relatively high and parallel, which indicates that the real-time fluorescent PCR of blaPSE has better amplification efficiency and repeatability, and the detected Ct value of 1.0×10$^2$ copies/µL blaPSE recombinant plasmid standards is 29, which belongs to a relatively high confidence interval.

Embodiment 4

A qPCR reaction system (20 µL) included 10 µL of TB Premix Ex Taq, 0.4 µL of each primer, 2 µL of DNA template, 2 µL of 2.6 mol/L 3,5-dihydroxy-3-methylpentanoic acid and 5.2 µL of ddH$_2$O. The rest were completely the same as those of Embodiment 1.

Embodiment 5

Figure 2:
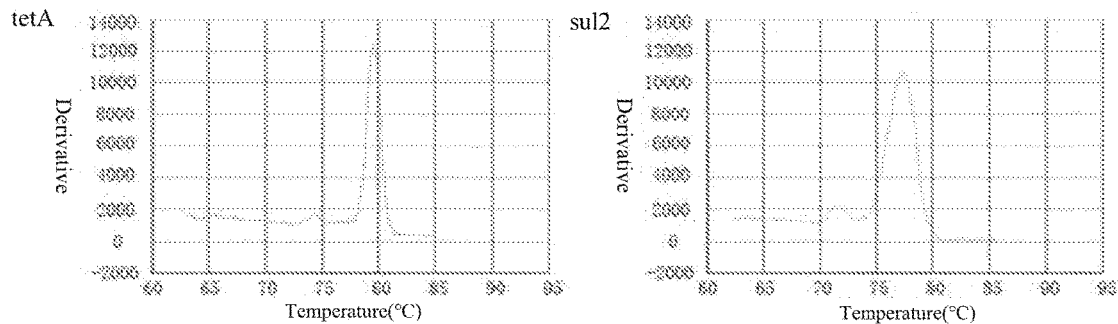
FIG. 2 shows melting curves for real-time fluorescent PCR of tetA and sul2 in Embodiment 1 of the invention.

1.0×10$^6$ copies/µL of tetA and sul2 recombinant plasmid standards were respectively subjected to real-time fluorescent PCR reaction according to the qPCR reaction systems in Embodiment 1 and Embodiment 2. Reaction conditions included: pre-denaturation at 95° C. for 30 s; and denaturation at 95° C. for 5 s, annealing at 60° C. for 30 s, extension at 72° C. for 30 s, for 40 cycles. Melting curve procedures included: melting at 95° C. for 3 min, 60° C. for 1 min and 95° C. for 15 s, and starting collecting fluorescence signals at 60° C. to make melting curves. Melting curves for real-time fluorescent PCR of tetA and sul2 in Embodiment 1 are shown in FIG. 2. Melting curves for real-time fluorescent PCR of tetA and sul2 in Embodiment 2 are shown in FIG. 3.

Figure 3:
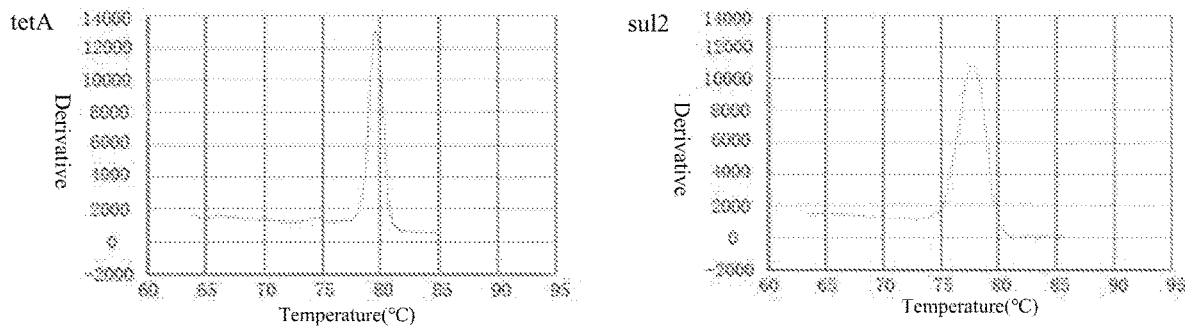
FIG. 3 shows melting curves for real-time fluorescent PCR of tetA and sul2 in Embodiment 2 of the invention.

FIGS. 2 and 3 show that, compared with Embodiment 2, the melting curves for real-time fluorescent PCR of tetA and sul2 in Embodiment 1 have a relatively weak second peak, i.e., nonspecific products exist in real-time fluorescent PCR of tetA and sul2 in Embodiment 1, which can affect the accuracy of detection results of real-time fluorescent quantitative PCR; and this indicates that agmatine sulfate can be added into the real-time fluorescent quantitative PCR system to improve the activity of Taq enzyme and inhibit the occurrence of nonspecific reaction during real-time fluorescent PCR of tetA and sul2.

Embodiment 6

Establishment of standard curves of target genes: recombinant plasmids were taken as positive templates to establish standard curves of real-time fluorescent quantitative PCR. The copy number was calculated according to the following formula: the copy number=(mass/molecular weight)×6.02×10$^{23}$. Before the absorbance was measured, the plasmids need to be diluted from 10 µL to 100 µL; and a mass concentration of the plasmids was calculated according to 1A$_{260\ nm}$=50 µg/mL.

A standard curve of each system was constructed by taking logarithm of an initial template copy number as the abscissa and taking a corresponding Ct value as the ordinate. R$^2$ value of the curve was calculated, and the amplification efficiency E=[10$^{(-1/slope)}$−1]×100%. Standard curves of various antibiotic drug resistant genes, intI1 integron and reference gene 16S rDNA were obtained. A concentration range of plasmids used for the standard curves was 10$^1$-10$^9$ copies/µL. The obtained standard curves should meet the following requirements: the correlation coefficient R$^2$≥0.99, and the amplification efficiency E is 90%-110%.

TABLE 2

Standard Curves Established Based on Embodiment 1

| Gene | Standard curve | $R^2$ | Amplification efficiency E (%) | Minimum detection limit (copies/pL) |
|---|---|---|---|---|
| tetA | y = −3.1811x + 36.978 | 0.9974 | 106.23 | 156 |
| sul2 | y = −3.1882x + 37.350 | 0.9987 | 105.90 | 202 |
| blaPSE | y = −3.5157x + 46.946 | 0.9949 | 92.50 | $6.6 \times 10^4$ |
| cmlA | y = −3.5752x + 35.713 | 0.991 | 90.42 | 40 |
| qnrS | y = −3.4110x + 37.383 | 0.993 | 96.41 | 146 |
| aac(6′)-Ib | y = −3.3930x + 34.634 | 0.9901 | 97.12 | 24 |
| int I 1 | y = −3.5515x + 33.760 | 0.998 | 91.24 | 11.5 |
| 16S rDNA | y = −3.3770x + 46.401 | 0.9921 | 97.75 | — |

TABLE 3

Standard Curves Established Based on Embodiment 2

| Gene | Standard curve | $R^2$ | Amplification efficiency E (%) | Minimum detection limit (copies/pL) |
|---|---|---|---|---|
| tetA | y = −3.3192x + 38.295 | 0.9975 | 98.71 | 316 |
| sul2 | y = −3.3276x + 38.334 | 0.9988 | 99.76 | 320 |
| blaPSE | y = −3.5677x + 47.326 | 0.9991 | 90.67 | $7.2 \times 10^4$ |
| cmlA | y = −3.5674x + 35.674 | 0.9997 | 90.68 | 40 |
| qnrS | y = −3.4212x + 37.799 | 0.9989 | 96.02 | 191 |
| aac(6′)-Ib | y = −3.4151x + 35.131 | 0.9991 | 96.25 | 32 |
| intI1 | y = −3.5588x + 33.8727 | 0.9995 | 90.98 | 12.2 |
| 16S rDNA | y = −3.3949x + 46.539 | 0.9986 | 97.04 | — |

TABLE 4

Standard Curves Established Based on Embodiment 3

| Gene | Standard curve | $R^2$ | Amplification efficiency E (%) | Minimum detection limit (copies/pL) |
|---|---|---|---|---|
| tetA | y = −3.3235x + 37.778 | 0.9978 | 99.93 | 219 |
| sul2 | y = −3.326x + 38.133 | 0.9989 | 99.83 | 279 |
| blaPSE | y = −3.35x + 35.417 | 0.9989 | 98.84 | 42 |
| cmlA | y = −3.5778x + 35.692 | 0.9998 | 90.32 | 39 |
| qnrS | y = −3.4156x + 37.449 | 0.9999 | 96.23 | 152 |
| aac(6′)-Ib | y = −3.3921x + 35.076 | 0.9993 | 97.15 | 32 |
| intI1 | y = −3.5548x + 33.791 | 0.9998 | 91.22 | 11.6 |
| 16S rDNA | y = −3.3843x + 46.743 | 0.9986 | 97.46 | — |

TABLE 5

Standard Curves Established Based on Embodiment 4

| Gene | Standard curve | $R^2$ | Amplification efficiency E (%) | Minimum detection limit (copies/pL) |
|---|---|---|---|---|
| tetA | y = −3.1923x + 37.097 | 0.9958 | 105.71 | 168 |
| sul2 | y = −3.195x + 37.410 | 0.9979 | 105.58 | 209 |
| blaPSE | y = −3.3421x + 35.475 | 0.9985 | 99.17 | 44 |
| cmlA | y = −3.5774x + 35.810 | 0.9996 | 90.34 | 42 |
| qnrS | y = −3.4108x + 37.400 | 0.9986 | 96.42 | 148 |
| aac(6′)-Ib | y = −3.3996x + 34.714 | 0.9988 | 96.86 | 25 |
| int I 1 | y = −3.55x + 33.8416 | 0.9995 | 91.29 | 12.1 |
| 16S rDNA | y = −3.3812x + 46.764 | 0.9987 | 97.58 | — |

Table 2 shows that according to the standard curves of the target genes obtained in Embodiment 1, the amplification efficiency E between the Ct value and the copy number of each target gene ranges from 90.42% to 106.23%, so the amplification efficiency is within a qPCR efficiency range (90%-110%); the correlation coefficient $R^2$ ranges from 0.9901 to 0.9987; generally, the obtained curve may be called qualified standard curve only if $R^2>0.985$; and when $R^2$ is closer to 1.00, the curve is more credible, so all the curves have better accuracy and repeatability. Slopes of the curves range from −3.1811 to −3.5752, which meets the requirements (−3.1 to −3.59) of qPCR experiment; and the relative standard deviations (RSDs) are all less than 5.1%. This indicates that the eight standard curves have excellent linear relationship and can be used to calculate the copy number of each gene in the sample to be tested. 31 is taken as the detection limit of Ct; and the established qPCR method has a minimum detection limit of $6.6\times10^4$ copies/μL for blaPSE, and a minimum detection limit of 11.5-202 copies/μL for tetA, sul2, cmlA, qnrS, aac(6')-Ib and intI1.

Comparison for Table 3, Table 4 and Table 5 shows that compared with Embodiment 1 and Embodiment 2, the amplification efficiencies of the gene blaPSE in Embodiment 3 and Embodiment 4 are apparently higher and closer to 1, the minimum detection limit is reduced by three orders of magnitude, and the correlation coefficient $R^2$ is closer to 1; this indicates that 3,5-dihydroxy-3-methylpentanoic acid is added into the real-time fluorescent quantitative PCR system to benefit close cooperation between the product and the template during amplification, promote the real-time fluorescent PCR amplification, and improve the amplification efficiency, so that the amplification efficiency of blaPSE is closer to 1, the minimum detection limit of blaPSE is reduced, and the established standard curve of blaPSE recombinant plasmids is more reliable and has good sensitivity, accuracy and repeatability. Compared with Embodiment 1 and Embodiment 4, the amplification efficiencies of genes tetA and sul2 in Embodiment 2 and Embodiment 3 are lower and closer to 1, and the correlation coefficient $R^2$ is closer to 1; this indicates that agmatine sulfate can be added into the real-time fluorescent quantitative PCR system to improve the activity of Taq enzyme, inhibit the occurrence of nonspecific reactions of tetA and sul2 during real-time fluorescent PCR, and prevent the interference of nonspecific amplification to quantitative detection, so that the higher amplification efficiencies of tetA and sul2 are closer to 1, and the established standard curves of tetA and sul2 recombinant plasmids are more reliable and have better accuracy and repeatability. In summary, the amplification efficiencies of tetA and sul2 in Embodiment 3 are closer to 1, while blaPSE has a lower minimum detection limit, and the established standard curves of other genes have higher correlation coefficient, thereby having little influence on the amplification efficiency and the minimum detection limit.

Embodiment 7

Actual Detection of Samples:

The qPCR methods established in Embodiment 1 and Embodiment 3 were respectively used to perform quantitative detection on bacteria solutions of Macrobrachium, Goldfish, Yeltowhead catfish and Large yellow croaker on the market. For each sample, gills, intestines and epidermal mucus of fishes, and sand veins and shrimp heads of shrimps were respectively collected under aseptic conditions and cut into pieces; then 10 g of sample was taken and added into a conical flask containing 90 mL of sterile saline solution, and was fully shaken and uniformly mixed to prepare a sample suspension. The suspension was dipped with an inoculating loop and placed in a test tube containing nutrient broth, and then was cultured at 30° C. for 12 h. 1 mL of culture was taken and subjected to boiling water bath for 5 min, then was immediately put on ice to be cooled for 2 min, and was centrifuged at 5000 r/min for 1 min; and supernatant was taken as a DNA template. The qPCR reaction conditions are shown in Embodiment 3. Because the total amount of microorganisms in different samples is different, in order to reduce deviation, 16S rDNA was added as a reference gene. A pollution level of a target gene is expressed by relative abundance, which is a ratio of the copy number of the target gene to the copy number of the corresponding gene 16S rDNA. The obtained Ct value is substituted into a corresponding standard curve equation to calculate the relative abundance of the target gene in the sample.

Figure 4:
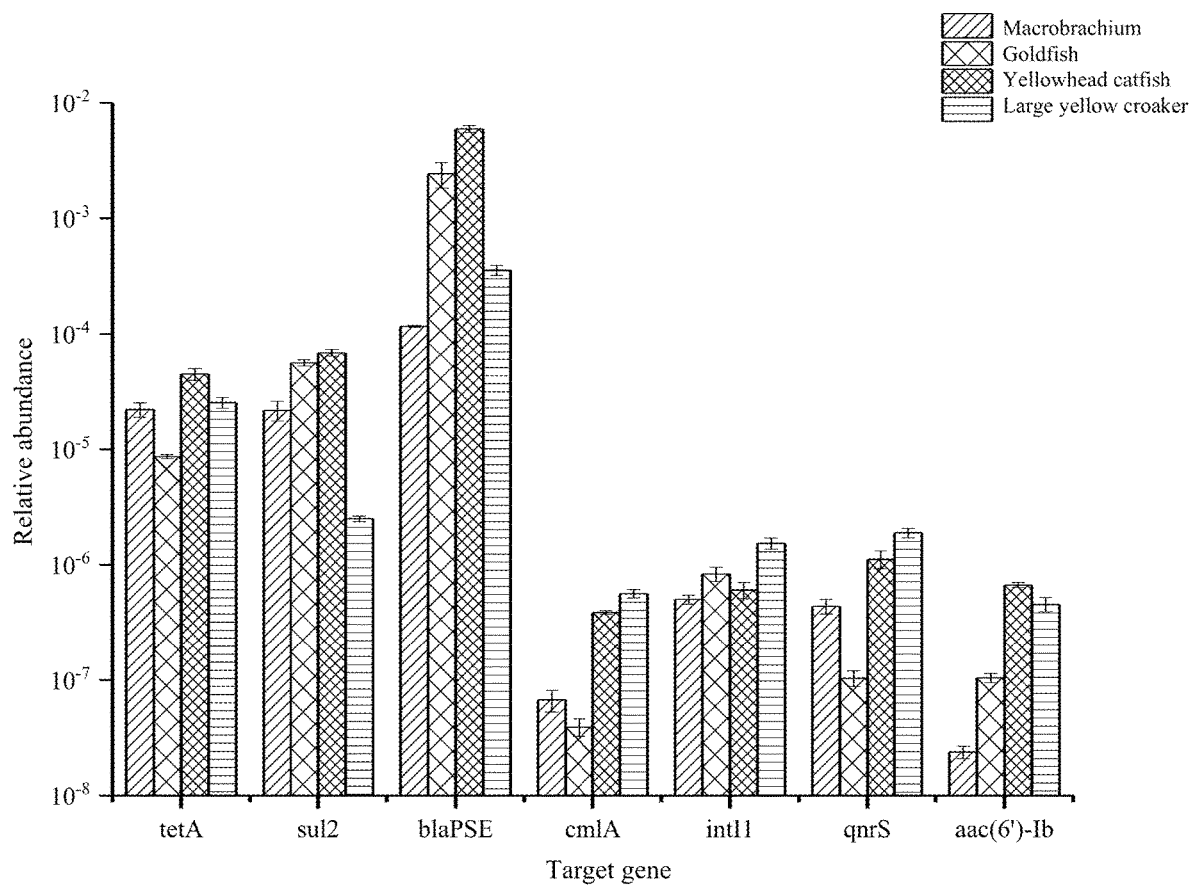
FIG. 4 shows relative abundances of target genes in a sample detected in Embodiment 1 of the invention.

The relative abundances of the target genes in the samples detected in Embodiment 1 are shown in FIG. 4; results of FIG. 4 show that tetA, sul2, blaPSE, cmlA, intI1, qnrS and aac(6')-Ib are all detected in the four samples; the gene copy numbers span six orders of magnitude, the minimum value is $2.4\times10^{-8}$ (gene aac(6')-Ib in the sample of Macrobrachium), and the maximum value is $6.0\times10^{-3}$ (blaPSE in the sample of Yellowhead catfish). The copy numbers of tetA, sul2 and blaPSE are relatively high in all samples, ranging from $2.5\times10^{-6}$ to $6.0\times10^{-3}$; the contents of aac(6')-Ib and cmlA are generally lower than those of other ARGs, ranging from $2.4\times10^{-8}$ to $6.7\times10^{-7}$; and the content of intI1 ranges from $5.0\times10^{-7}$ to $1.5\times10^{-6}$. The difference between relative abundances of the same antibiotic drug resistant genes in samples reaches 1-2 orders of magnitude; tetA, sul2 and blaPSE have relatively high copy numbers in all samples; blaPSE has the highest relative abundance, and belongs to the dominant ARG; and the contents of aac(6')-Ib and cmlA are relatively low, and the relative abundances do not exceed $7\times10^{-7}$.

Figure 5:
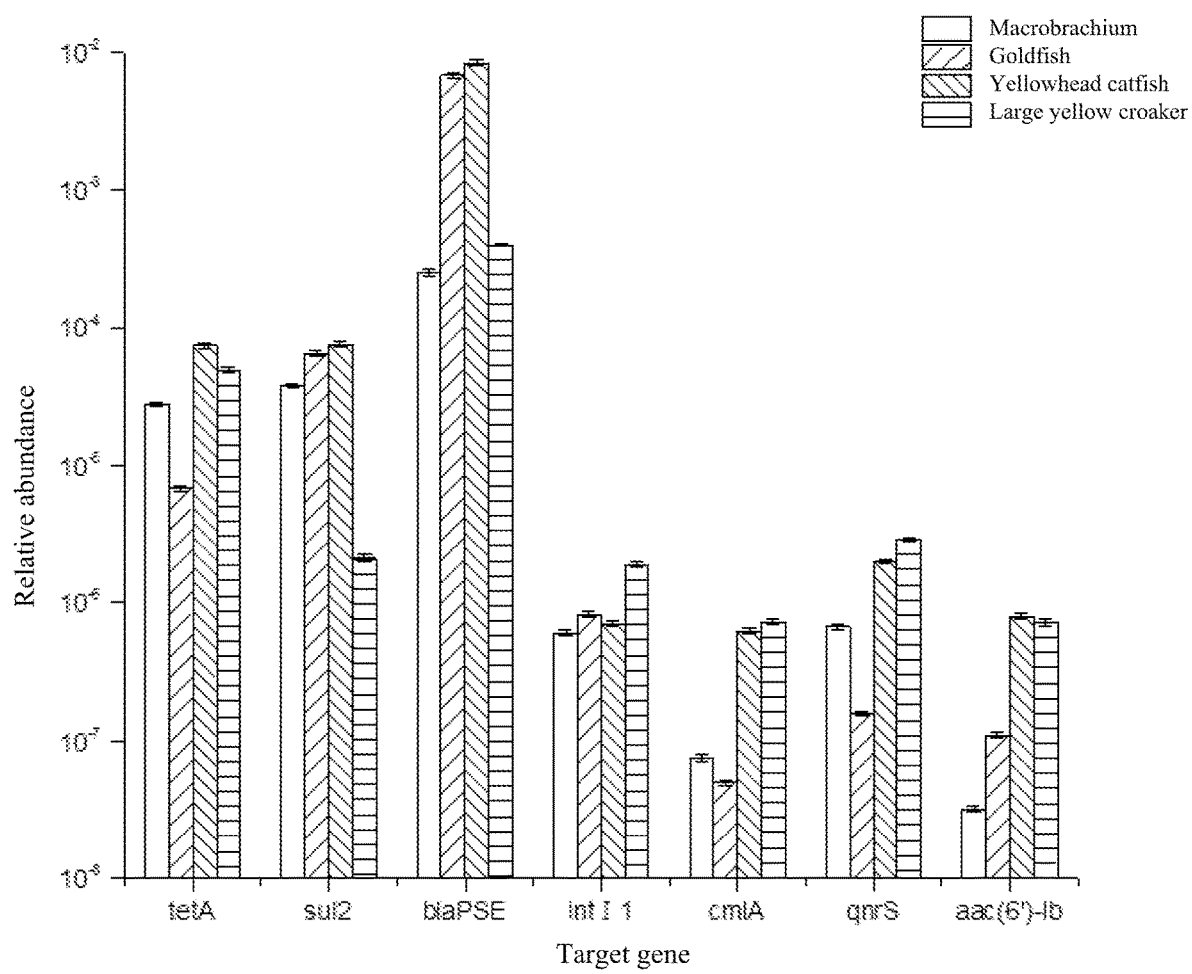
FIG. 5 shows relative abundances of target genes in a sample detected in Embodiment 3 of the invention.

The relative abundances of the target genes in the samples detected in Embodiment 3 are shown in FIG. 5; results of FIG. 5 show that tetA, sul2, blaPSE, cmlA, intI1, qnrS and aac(6')-Ib are all detected in the four samples; the gene copy numbers span six orders of magnitude, the minimum value is $3.2\times10^{-8}$ (gene aac(6')-Ib in the sample of Macrobrachium), and the maximum value is $6.8\times10^{-3}$ (blaPSE in the sample of Yeltowhead catfish). The copy numbers of tetA, sul2 and blaPSE are relatively high in all samples, ranging from $2.1\times10^{-6}$ to $6.8\times10^{-3}$; the contents of aac(6')-Ib and cmlA are generally lower than those of other target genes, ranging from $3.2\times10^{-8}$ to $7.2\times10^{-7}$; and the content of intI1 ranges from $6.0\times10^{-7}$ to $1.9\times10^{-6}$. The difference between relative abundances of the same antibiotic drug resistant genes in samples reaches 1-2 orders of magnitude; tetA, sul2 and blaPSE have relatively high copy numbers in all samples; blaPSE has the highest relative abundance, and belongs to the dominant ARG; and the contents of aac(6')-Ib and cmlA are relatively low, and the relative abundances do not exceed $7.2\times10^{-7}$.

Embodiment 8

Analysis on the Correlation Between Antibiotic Drug Resistant Genes and intI1:

The correlation of target genes was analyzed by Spearman correlation according to the relative abundances of target genes in the samples detected in Embodiment 1; and the results are shown in Table 6.

TABLE 6

Correlation Between antibiotic drug resistant genes and intI1

|  | tetA | sul2 | blaPSE | cmlA | intI1 | qnrS |
|---|---|---|---|---|---|---|
| sul2 | 0.286 | 1.000 | | | | |
| blaPSE | 0.381 | 0.810* | 1.000 | | | |
| cmlA | 0.599 | −0.299 | 0.156 | 1.000 | | |
| int I 1 | −0.190 | −0.381 | 0.190 | 0.479 | 1.000 | |
| qnrS | 0.667 | −0.357 | 0.024 | 0.874** | 0.405 | 1.000 |
| aac(6')-Ib | 0.667 | 0.357 | 0.738* | 0.659 | 0.357 | 0.524 |

Note:
*indicates significant difference, and P < 0.05;
**indicates highly significant difference, and P < 0.001.

The correlation of certain genes is very apparent; for example, sul2 and blaPSE, blaPSE and aac(6')-Ib, and cml A and qnrS are respectively subjected to significant positive correlation; this may be because the antibiotic drug resistant genes have the same host bacteria; a number of microorganisms always carry five specific antibiotic drug resistant genes, i.e., increment and distribution of the five antibiotic drug resistant genes are correlated with related specific bacteria, for example, *Clostridium* usually carries tetO, tet32 and ermB, while *Escherichia* carries acrA, mdtH, mdtL and mdtO; *Aeromicrobium* and sul2 are subjected to significant positive correlation, so sul2 mainly exists in such bacteria; and this may also be because two genes are simultaneously located on a larger plasmid or other element. Factors such as the content of antibiotics and the content of heavy metals in aquatic environment may affect the distribution of antibiotic drug resistant genes, but the distribution of antibiotic drug resistant genes may more probably affected by affecting a total bacterial community structure. In addition, the five antibiotic drug resistant genes and the abundance of intI1 are free from correlation.

Conventional technologies in the above embodiments are prior arts known to those skilled in the art, and will not be described in detail here.

The embodiments mentioned above are only used for illustrating the invention, rather than limiting the invention; those ordinary skilled in the art can perform various changes and modifications without departing from spirit and scope of the invention. Therefore, all equivalent technical solutions also belong to the scope of the invention, and the patent protection scope of the invention should be defined by the Claims.

What is claimed is:

1. A quantitative detection method for six antibiotic drug resistant genes in an aquatic product, wherein the method comprises the following steps: taking the total DNA of bacteria carried by an aquatic product to be tested as a template, respectively using a primer pair I, a primer pair II, a primer pair III, a primer pair IV, a primer pair V, and a primer pair VI to carry out fluorescent quantitative PCR amplification, and quantifying antibiotic drug resistant genes tetA, sul2, cmlA, qnrS, aac(6')-Ib, and blaPSE in said aquatic product according to the Ct value;

the primer pair I is composed of a primer tetA-F and a primer tetA-R, a sequence of the primer tetA-F is SEQ ID NO.1, and a sequence of the primer tetA-R is SEQ ID NO.2;

the primer pair II is composed of a primer sul2-F and a primer sul2-R, a sequence of the primer sul2-F is SEQ ID NO.3, and a sequence of the primer sul2-R is SEQ ID NO.4;

the primer pair III is composed of a primer cmlA-F and a primer cmlA-R. a sequence of the primer cmlA-F is SEQ ID NO.5, and a sequence of the primer cmlA-R is SEQ ID NO.6;

the primer pair IV is composed of a primer qnrS-F and a primer qnrS-R, a sequence of the primer gnrS-F is SEQ ID NO.7, and a sequence of the primer gnrS-R is SEQ ID NO.8:

the primer pair V is composed of a primer aac (6')-Ib-F and a primer aac(6')-Ib-R, a sequence of the primer aac(6')-Ib-F is SEQ ID NO.9, and a sequence of the primer aac (6')-Ib-R is SEQ ID NO.10; and the primer pair VI is composed of a primer blaPSE-F and a primer blaPSE-R, a sequence of the primer blaPSE-F is SEQ ID NO.11, and a sequence of the primer blaPSE-R is SEQ ID NO.2;

a system for the fluorescent quantitative PCR amplification comprises: 10 82 L of qPCR premix reagent, 0.4 µL of each primer and 2 µL of DNA template, 1 µL of 5.2-10.7 mmol/L agmatine sulfate, 2 µL of 2.2-3.6 mol/L 3,5-dihydroxy-3-methylpentanoic acid, supplemented with ddH$_2$O to 20 µl.

2. The method according to claim 1, wherein reaction conditions of the fluorescent quantitative PCR amplification comprise: pre-denaturation at 95° C. for 30 s; and denaturation at 95° C. for 5 s, annealing at 60° C. for 30 s and extension at 72° C. for 30 s, for 40 cycles.

3. The method according to claim 1, wherein minimum detection limits of tetA, sul2, cmlA, qnrS and aac(6')-Ib are 24-202 copies/µL; and a minimum detection limit of blaPSE is 6.6×10$^4$ copies/µL.

* * * * *